No. 865,110. PATENTED SEPT. 3, 1907.
G. F. KNAPP.
ROASTER.
APPLICATION FILED FEB. 19, 1907.
3 SHEETS—SHEET 2.
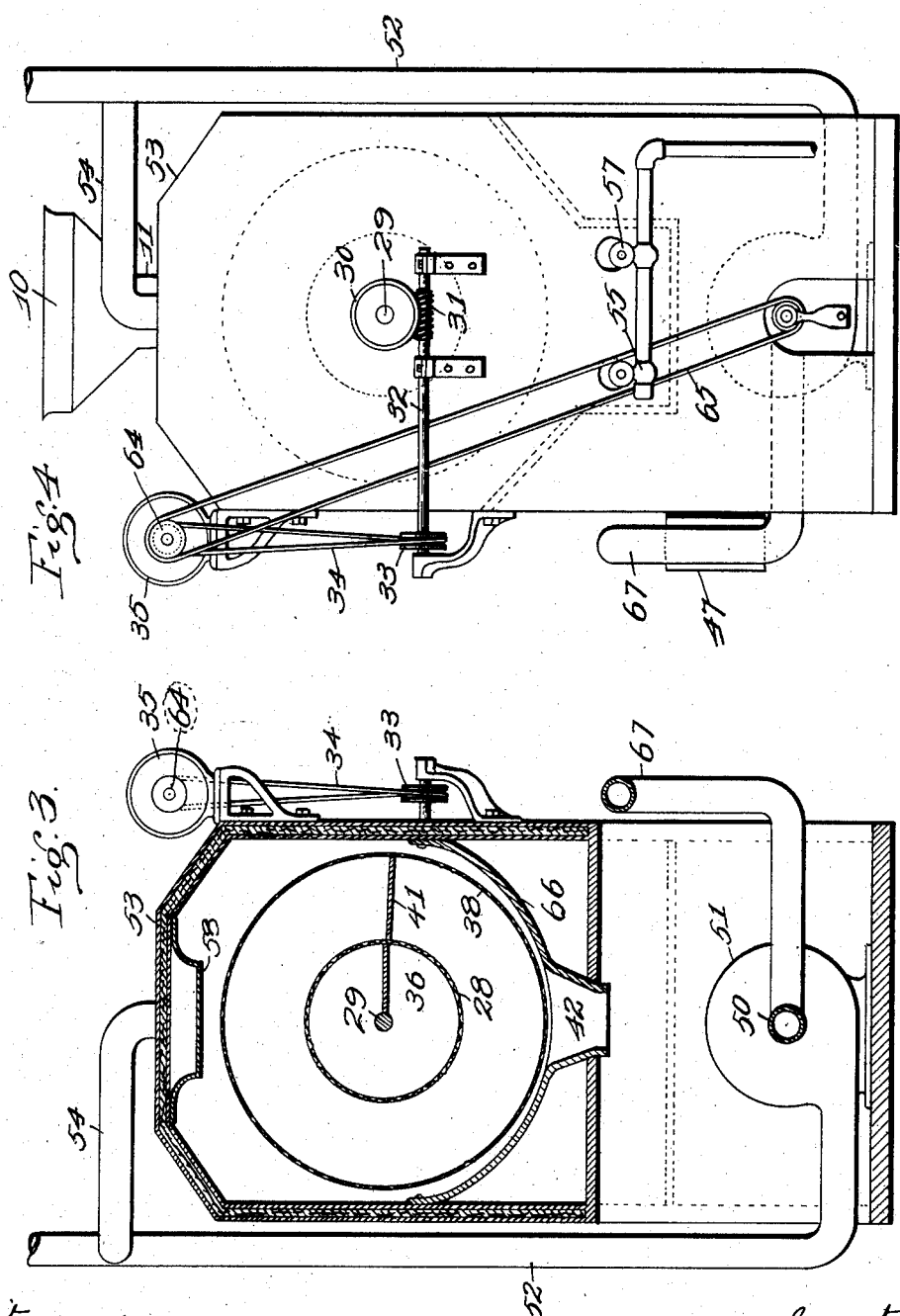

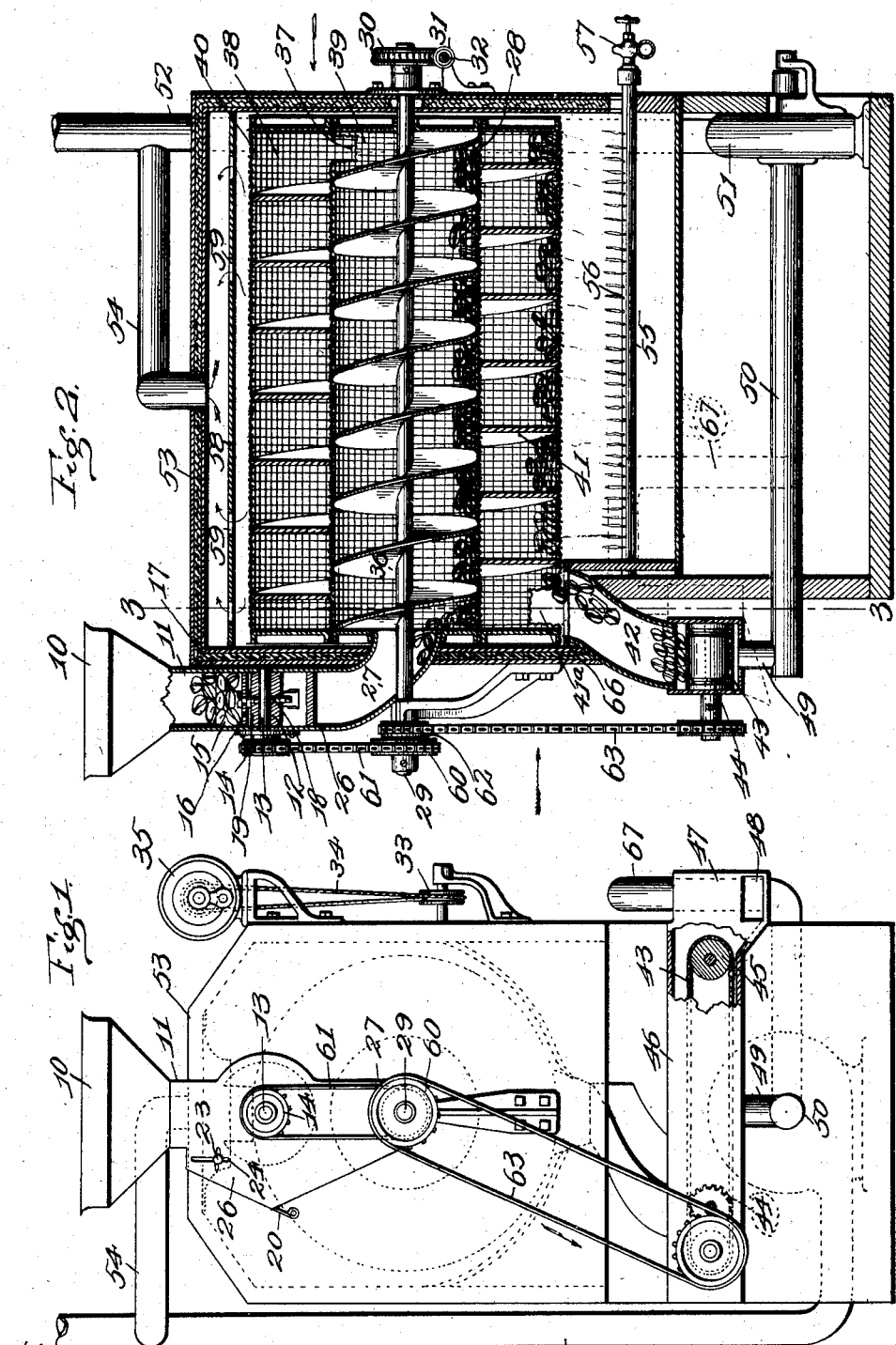

No. 865,110. PATENTED SEPT. 3, 1907.
G. F. KNAPP.
ROASTER.
APPLICATION FILED FEB. 19, 1907.
3 SHEETS—SHEET 3.
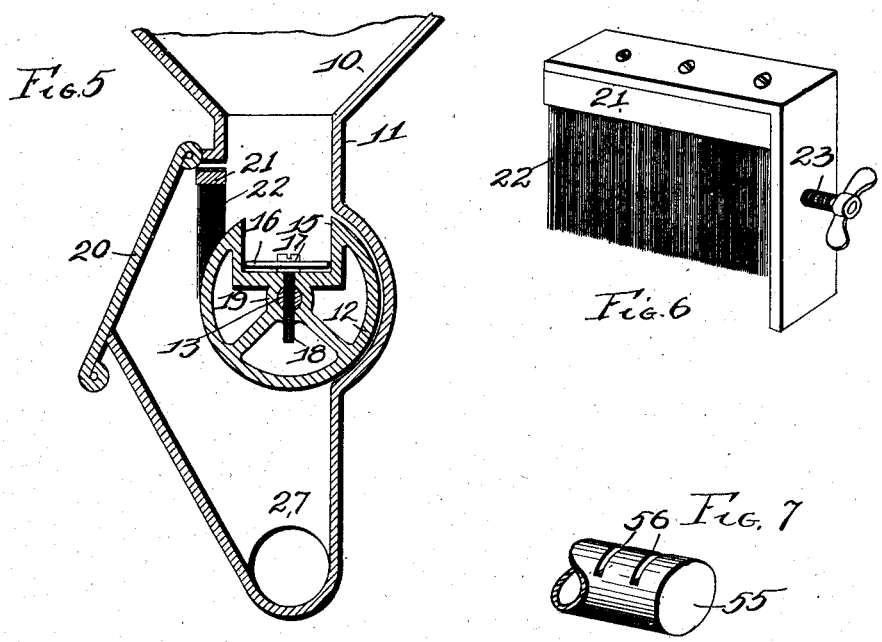
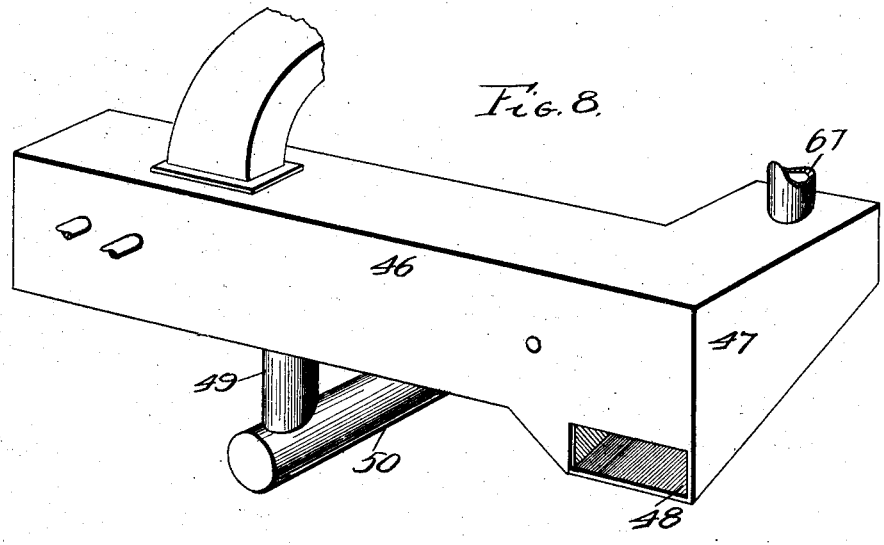
Witnesses
Inventor
George F. Knapp
by Hopkins & Ericks attys.

UNITED STATES PATENT OFFICE.

GEORGE F. KNAPP, OF ST. LOUIS, MISSOURI, ASSIGNOR TO ST. LOUIS TIN & SHEET METAL WORKING COMPANY, A CORPORATION OF MISSOURI.

ROASTER.

No. 865,110.     Specification of Letters Patent.     Patented Sept. 3, 1907.

Application filed February 19, 1907. Serial No. 358,304.

*To all whom it may concern:*

Be it known that I, GEORGE F. KNAPP, a citizen of the United States, and a resident of St. Louis, Missouri, have invented certain new and useful Improvements in Roasters, of which the following is a specification.

My invention relates to an improved roaster for use in roasting coffee, peanuts and the like, and has for its object to provide a machine capable of roasting vegetable substances of various sizes; the roasting being accomplished uniformly and the roasted substance being free from chaff and the like before being delivered from the machine.

In the drawings—Figure 1 is an end view of the machine embodying my invention. Fig. 2 is a vertical central sectional view of the same. Fig. 3 is a vertical view in section taken along the line 3—3 of Fig. 2. Fig. 4 is a view of the end of said machine opposite to that shown in Fig. 1. Fig. 5 is an enlarged view of the feeding device employed in my invention. Fig. 6 is a detail perspective view of the brush made use of in connection with my invention. Fig. 7 is a detail perspective view of a portion of the burner. Fig. 8 is a detail perspective view of the conveyer into which the coffee is conveyed after being roasted.

As indicated in the drawings, the substance desired to be roasted, which may be indifferently malt, coffee, peanuts or any other desired substance, is conveyed into the hopper 10, the hopper 10 connecting with the delivery spout 11. The wheel 12 is mounted beneath the delivery spout 11 upon the axle 13; the axle 13 being provided at its outer end with the sprocket-wheel 14. The wheel 12 is provided with the chamber 15 having an adjustable bottom 16. The adjustable bottom 16 is carried by the block 17, which block 17 is provided with the screw 18 extending entirely through the hub 19 and axle 13; so that by the rotation of the block 17 the bottom 16 is raised or lowered to adjust the capacity of the chamber 15.

In order to simplify the remainder of this description, the substance to be roasted will be referred to as coffee; it being understood that the mode of operation is the same regardless of the character of the substance to be roasted, and that the size of the chamber 15 is varied as hereinabove described, in accordance with the character of the substance to be roasted.

Beneath the downspout 11 a door 20 is provided through which access to the wheel 12 and chamber 15 is secured.

A block 21 provided with depending metallic brush-members 22 is adjustably mounted at the side of the wheel 12 by means of the screw 23 which extends through the slot 24 in the housing-wall 26. By means of the adjustment of this brush the amount of coffee carried by the chamber 15 and discharged into the inlet spout 27 is uniformly the same. Upon each revolution of the wheel 12 the chamber 15 discharges its contents into the inlet-spout 27 and the contents are received within the secondary cylinder 28. The secondary cylinder is carried by the shaft 29 having at its driving end the screw gear-wheel 30 intermeshing with the worm 31. The worm 31 is mounted on the axle 32, which axle 32 is provided with the belt-wheel 33 and driven by the belt 34 from the motor 35. The secondary cylinder 28 is provided throughout its length with the spiral guide 36 which serves as a conveyer to convey the coffee received through the inlet-spout 27 to the outer extremity of the secondary chamber 28, where it is discharged through the opening 37 into the primary cylinder 38. The primary cylinder 38 is concentric with the secondary cylinder 28 and is securely carried and revolved by means of the shaft 29. The secondary cylinder 28 is provided with a perforated outer wall 39 and the primary cylinder 38 is provided with the perforated wall 40; both of said walls being preferably made of wire mesh. The primary cylinder 38 is provided with the screw-guide 41 whereby the coffee received through the opening 37 is conveyed to the opposite end of the cylinder 38 and discharged through the opening 41ª into the discharge spout 42.

At the bottom of the discharge spout 42 I provide a belt-conveyer 43 carried by the pulleys 44 and 45 and operating in the casing 46. The coffee carried by the conveyer 43 is deposited in the compartment 47 from whence it is discharged through the spout 48. The casing 46 is provided at its bottom with the exhaust pipe 49, which, in turn, connects with the pipe 50 leading to the blower 51. The chaff remaining upon the coffee beans after the process of roasting is removed by the suction exerted by the blower 51, and blown outwardly through the flue 52. The flue 52 is connected with the interior of the housing 53 at its top by means of the pipe 54.

Mounted longitudinally beneath the primary cylinder 38, I have provided the burner 55 having a series of jets 56 and provided with the inlet-valve 57. The heat generated by the jets 56 passes through the cylinders 28 and 38 to the top of the housing where I provide the deflector 58 having openings 59 as shown in Fig. 2; the deflector 58 is mounted at the top of the housing as shown in dotted lines in Fig. 1, so that all of the heated air in escaping is compelled to pass through the openings 59. These openings are so arranged as to accomplish an equable distribution of heat in the interior of the roaster.

The shaft 29 is provided at its driving end with the sprocket-wheel 60 from which the sprocket-wheel 14 is driven by means of the chain-belt 61; and near its same extremity the shaft is provided with the sprocket-wheel 62 which serves to drive the pulley 44 by means of the chain-belt 63.

The motor 35 is provided with the pulley 64 carrying the belt 65, by which the blower 51 is driven.

I employ as many burners 55 as may be necessary to secure the desired degree of heat. The conveyer and roaster shown in the drawings embodies two of said burners mounted parallel to each other and equi-distant from the bottom of the primary cylinder 38.

At the end of the roaster at which the opening 41 is located I provide a funnel-like member 66 serving to guide the coffee discharged through the opening 41 through the downspout 42. At the top of the compartment 47 I also provide connecting pipes 67 connecting with the exhaust pipe 50 so that the coffee beans carried by the conveyer 43 are subjected to the necessary suction to remove the chaff, both while being conveyed and after being deposited into the compartment 47.

By means of the device thus described and illustrated in the drawings, I provide means whereby any desirable vegetable product may be roasted. The operation of roasting may be maintained continuously and the amount of each discharge of vegetable substance delivered to the roaster may be accurately predetermined.

Where it is desired to roast vegetable substances which are in themselves flaky, or from which it is not desired to remove chaff for any reason, the belt 65 is disconnected and the operation of the blower 51 is discontinued.

The jets 56 of the burner 55 are preferably formed in the manner shown in Fig. 6 of the drawings, the burner 55 consisting of a pipe which is provided with parallel, transverse cuts on its top to form the jets 56.

The screw-conveyers 36 and 41 are oppositely directed so that the coffee conveyed from left to right in the secondary cylinder 28 is reconveyed from right to left in the primary cylinder 38, thus causing the substance to be roasted to pass through the path of the heat ascending from the jets 56 in both directions during the process of roasting.

Having thus fully described my invention, what I claim as new and desire to have secured to me by the grant of Letters Patent, is:

1. In a device of the class described, a pair of concentric cylinders having their walls perforated, a single shaft carrying the cylinders, screw-conveyers mounted within the cylinders, burners for heating the cylinders and a worm mechanism whereby the shaft is revolved, substantially as specified.

2. In a device of the class described, a pair of concentric roasting cylinders having perforated walls, a single shaft carrying the cylinders, screw-conveyers mounted within the cylinders, burners for heating the cylinders, a worm mechanism whereby the shaft is revolved and a pulley mechanism for imparting motion to the worm mechanism, substantially as specified.

3. In a device of the class described, a hopper, a plurality of concentric cylinders, a shaft carrying said cylinders, a wheel having a chamber situated between the hopper and the inner cylinder for regulating the supply of substance to be roasted, screw guides for conveying the material from the inner cylinder to the outer cylinder, a worm mechanism whereby the shaft is revolved and burners for heating the cylinders, substantially as specified.

4. In a device of the class described, a hopper, an inlet-pipe, a wheel provided with an adjustable compartment seated within the inlet-pipe, the pipe adapted to receive the charge from said compartment, a roasting cylinder adapted to receive the charge from the last-named pipe, a screw-conveyer mounted in said cylinder, a second cylinder concentrically mounted with the first-named cylinder and adapted to receive the partially roasted charges therefrom, a screw-conveyer mounted in the last-named cylinder and adapted to convey the charge along the length of said cylinder, a shaft whereby said cylinders are carried, means for revolving said shaft and a suitable means of heat supply, substantially as specified.

5. In a device of the class described, a housing, burners for generating heat within the interior of the housing, a shaft horizontally mounted through said housing, concentric perforate roasting cylinders carried by said shaft, oppositely disposed screw-conveyers mounted in each of said cylinders, means for regulating the supply of the substance to be roasted, a blower and means for revolving said shaft and blower, substantially as specified.

6. In a device of the class described, the combination of a motor, a secondary cylinder driven by said motor, a primary cylinder concentrically mounted about said secondary cylinder and driven by said motor, burners for heating said cylinders, a wheel having an adjustable bottomed chamber for feeding the substance to be roasted to the interior of the secondary cylinder at one end, means for conveying said substance to the opposite end of the secondary cylinder and into the primary cylinder, means for conveying the substance thus conveyed in the primary cylinder to the opposite end of the primary cylinder and discharge it therefrom, a blower and means for subjecting the substance thus discharged to the action of the blower, substantially as described.

7. A coffee roaster, comprising an outer casing, a hopper located at one end of said casing, a shaft extending through the casing and through the inlet through which the material is fed into the casing, a screw-conveyer mounted upon the shaft, a cylinder of perforate material located around the conveyer, a second conveyer located upon the cylinder, and a cylinder of perforate material located upon the periphery of the outer conveyer, a wheel located in the hopper, a chamber provided with an adjustable bottom formed in the wheel whereby the material is deposited into the inner cylinder, an endless conveyer located on the one side of the casing on to which the material is passed after being discharged from the cylinders, and a blower and blower connections communicating with the endless conveyer to extract the chaff and to the upper portion of the casing to extract the odors, and a motor for imparting motion to the shaft wheel and endless conveyer, substantially as specified.

In testimony whereof, I have signed my name to this specification, in presence of two subscribing witnesses.

GEORGE F. KNAPP.

Witnesses:
ALFRED A. EICKS,
WALTER C. STEIN.